April 6, 1926.
E. A. SPERRY
1,579,669
WIRELESS REPEATER SYSTEM
Original Filed March 12, 1920    2 Sheets-Sheet 1
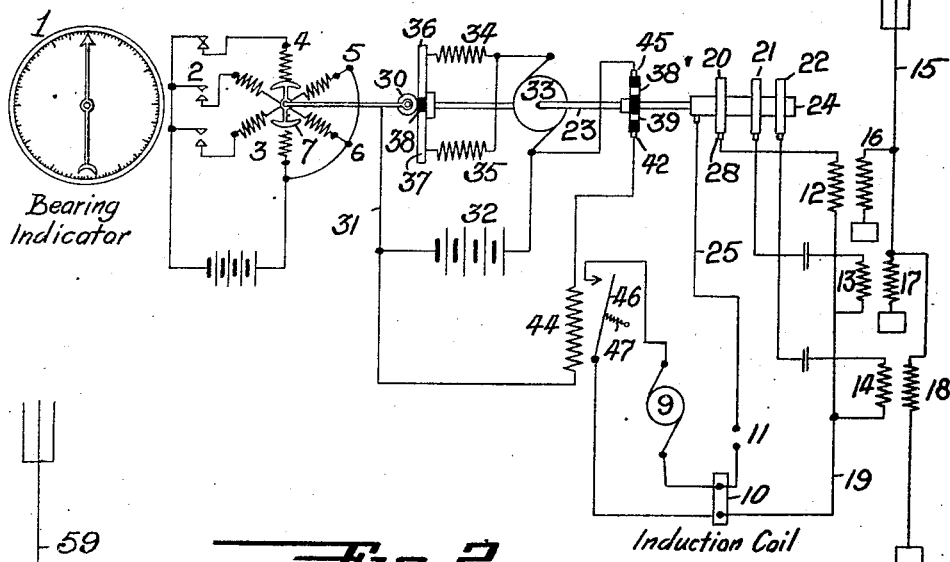
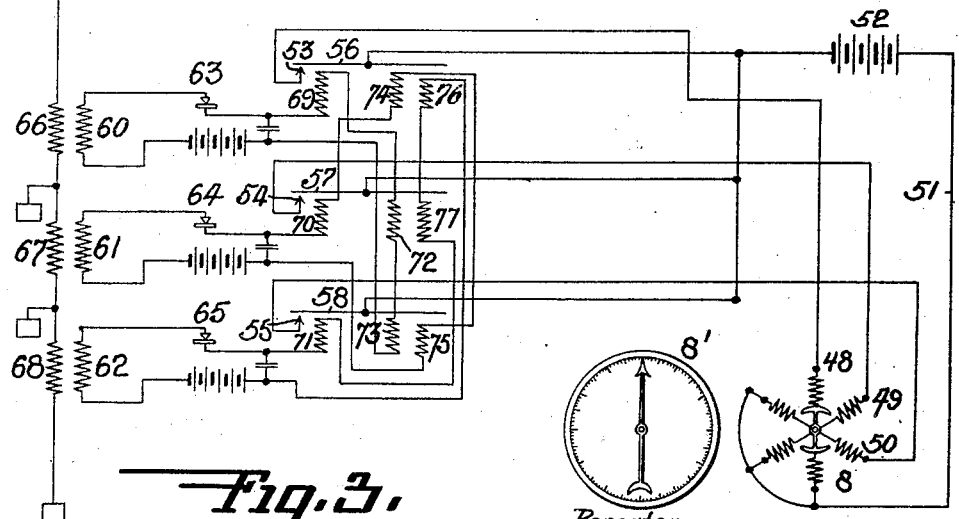
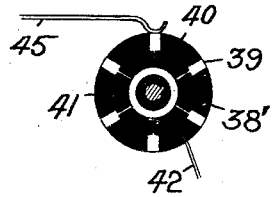
Inventor
ELMER A. SPERRY
By his Attorney
Herbert H. Thompson April 6, 1926.
E. A. SPERRY
1,579,669
WIRELESS REPEATER SYSTEM
Original Filed March 12, 1920   2 Sheets-Sheet 2
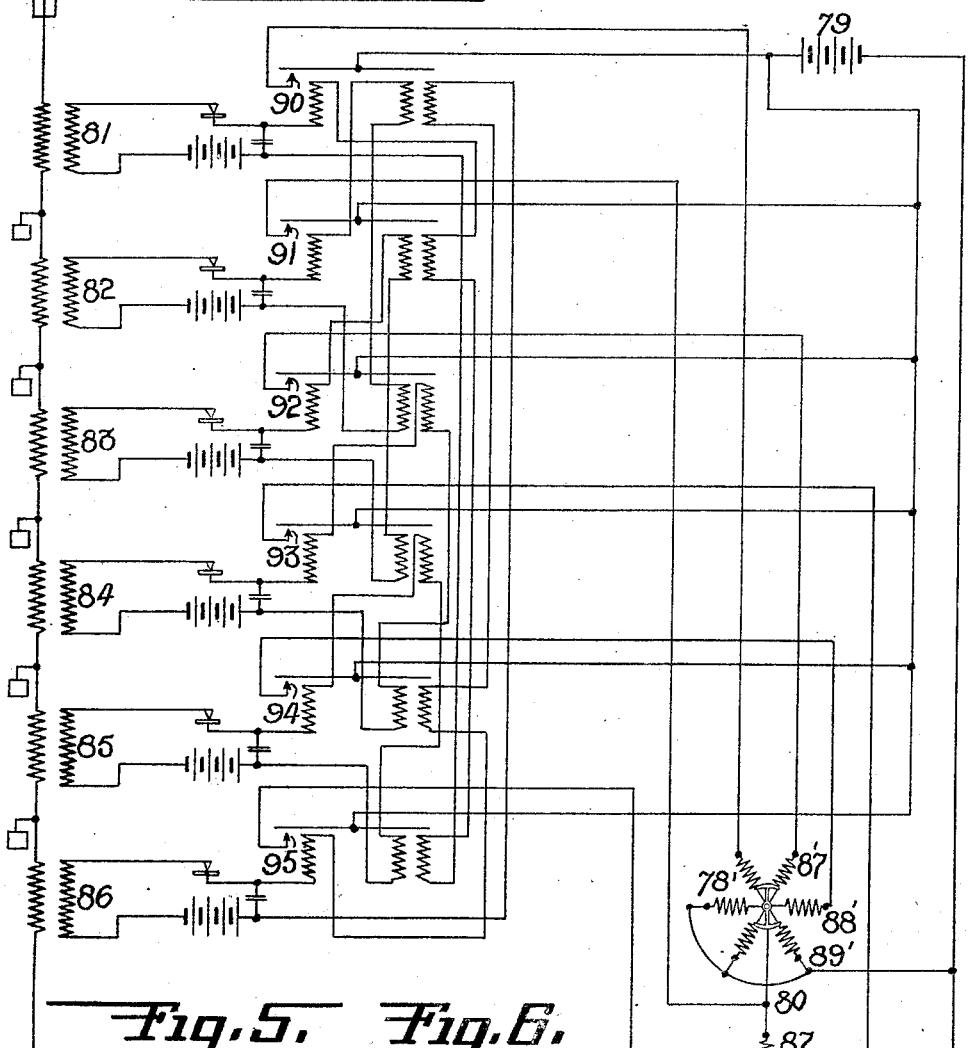
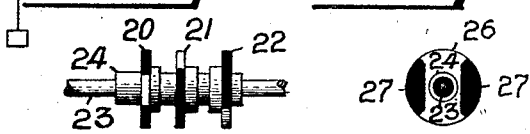
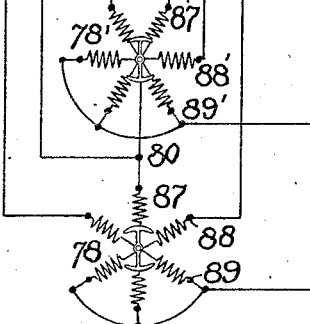
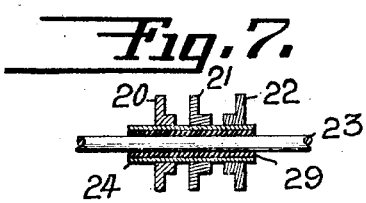
Inventor
ELMER A. SPERRY.
By his Attorney
Herbert H. Thompson Patented Apr. 6, 1926.

1,579,669

UNITED STATES PATENT OFFICE.

ELMER A. SPERRY, OF BROOKLYN, NEW YORK.

WIRELESS REPEATER SYSTEM.

Original application filed March 12, 1920, Serial No. 365,144. Patent No. 1,428,507, dated September 5, 1922. Divided and this application filed August 21, 1922, Serial No. 583,084. Renewed May 9, 1925.

*To all whom it may concern:*

Be it known that I, ELMER A. SPERRY, a citizen of the United States of America, residing at Brooklyn, in the county of Kings and State of New York, have invented certain new and useful Improvements in Wireless Repeater Systems, of which the following is a specification.

This invention relates to means for automatically transmitting the readings of an indicating member by wireless to a distant point and the present application is a division of my pending application Serial No. 365,144, filed March 12, 1920, issued as Patent No. 1,428,507, dated Sept. 5, 1922. My invention is particularly useful in automatically transmitting by wireless to or form an aircraft or other distant point the readings of a compass, fire control instrument, or other indicator on board a ship, whereby the ship's or airplane's heading or the bearing of a target observed from the ship may be constantly communicated to such distant point. Such a system has especial uses in the aerial ordnance control for heavy guns where the target is only visible from airplanes, which signal to the ship or other firing station the bearings of the target. In such a system it is very desirable that the airplane pilot know the bearing of the ship, guns, etc.

The chief object of my invention is to provide simple and efficient means for causing an indicator by means of radiant impulses to follow automatically the movements of another indicator at a distant point and especially adapted for the use outlined above. Other objects and advantages will become apparent as the description of my invention proceeds.

Referring to the drawings wherein I have shown what I now consider the preferred forms of my invention:

Fig. 1 is a diagrammatic view of one form of transmitting apparatus showing the wiring therefor.

Fig. 2 is a wiring diagram of a receiving apparatus for use in connection with the transmitting apparatus of Fig. 1.

Fig. 3 is a view of a detail.

Fig. 4 is a wiring diagram showing another form of receiving apparatus.

Figs. 5, 6, and 7 are views of details.

In Fig. 1 I have shown at 1 a conventional indicating instrument, which may be a rotatable compass card or fire control indicator. Actuated by this indicator in a manner well known in the art is a transmitter 2 electrically connected with a repeater motor 3. The transmitter 2 and repeater 3 may be of a type well known in the art, such as shown in the patent to Elmer A. Sperry Serial No. 1,296,440, issued March 4, 1919, for "repeater system for gyro-compasses", or in the application for patent by Elemer Meitner, Serial No. 227,680, filed April 10, 1918, for "self-setting transmission system". The repeater motor may be of the six pole type having three sets of coils 4, 5, and 6, and an armature 7.

For communicating to a distant point the indications or steps of the armature of repeater motor 3, I have provided means whereby, as the respective sets of coils of repeater 3 are energized, radiant impulses of different frequencies are sent, each of which frequencies corresponds to one set of coils of a repeater motor 8 at said distant station. Various means may be provided for transmitting wireless impulses of different frequencies in accordance with the particular coils of repeater 3 which are energized. One form of such means is shown in Fig. 1 and may be constructed substantially as follows:

The wireless sending apparatus may be of any conventional type. For instance, it may comprise a source 9 of E. M. F., connected to an induction coil 10, to the secondary or which are connected spark gap 11 and a plurality of inductances 12, 13, and 14 of different values corresponding to different frequencies of the radiant impulses. By means to be described later only one of said coils or inductances at a time is placed in circuit with the source of E. M. F. Each coil may cooperate with an open oscillatory circuit consisting of an antenna 15 and separately earthed coils 16, 17, and 18 cooperating with coils 12, 13, and 14, respectively.

The means for placing coils 12, 13, and 14 successively in circuit with generator 9 may take various forms, a preferred form being shown in Fig. 1. Said coils are shown each connected at one end with a wire 19 leading to one terminal of the induction coil and at their other ends with brushes 28 engaging members 20, 21, and 22, respectively. The latter members are shown in Figs. 5, 6, and 7 mounted on a conducting sleeve 24 on shaft 23, which sleeve is connected by wire 25 with the induction coil. Each of said members comprises a double contact portion 26 and insulation portions 27 as shown in Fig. 5. The contact portions of members 20, 21 and 22 are in engagement with sleeve 24 and may be so arranged that when a contact portion of one member passes out from under its cooperating brush, a contact portion of the next contact will come under its corresponding brush, and so on. Sleeve 24 is shown separated by insulation 29 from shaft 23. From the construction above described it will now be evident that, if shaft 23 be rotated to follow the movements of repeater 3, and the contact portions of members 20, 21, and 22 be suitably arranged with respect to said shaft, one of coils 12, 13, and 14 corresponding with the particular set 4, 5, or 6 of the coils of repeater 3 which is energized, will be connected in the sending circuit. Shaft 23 might be connected directly with the armature of repeater motor 3, but owing to the possibility of the motor falling out of step if overloaded, I prefer to employ in connection therewith a follow-up system.

As shown in Fig. 1, the aforesaid follow-up system may comprise a trolley 30 rotatable with the armature of repeater motor 3 and connected by a conductor 31 with one terminal of a battery 32 or other source of E. M. F., the other terminal of which source of E. M. F. may be connected with one terminal of a motor 33. The other terminal of the motor may be connected as shown with oppositely wound field coils 34 and 35, which coils are connected at their other ends with contact portions 36 and 37 respectively of a drum 38 fixed to shaft 23. The latter shaft is driven by the motor 33. When armature 7 is at rest, trolley 30 rests on a strip of insulation between contact portions 36 and 37. When, however, said armature moves in one direction or the other, it will be evident that current will flow through motor 33 and one or the other of field coils 34, 35 thereby causing motor 33 to turn in such direction as to bring the aforesaid strip of insulation again under trolley 30. Shaft 23 and the contact members mounted thereon are thus turned to follow-up the movements of repeater motor 3.

For causing a wireless impulse to be sent each time that armature 7 moves through one step I may utilize means arranged substantially as follows: On shaft 23 is a member 38' of insulating material having a plurality of contact segments 39 arranged at suitable portions along its periphery and a conducting hub 40 insulated from shaft 23 by means of a sleeve 41. In the example shown, six contact segments 39 are provided and are suitably connected to conducting hub 40. The latter is engaged by a brush 42 connected by conductor 43 to a relay magnet coil 44, which coil is connected as shown to one terminal of battery 32. The other terminal of said battery is shown connected with a brush 45 in engagement with the periphery of member 38'. The armature 46 of relay coil 44 is shown adapted to close a circuit through generator 9 and induction coil 10 when said armature is attracted by said coil. Normally the armature is held by a spring 47 in a position in which the aforesaid circuit is open.

The operation of the above described apparatus will now be readily understood. As indicator 1 turns, transmitter 2 is actuated and armature 7 and trolley 30 are caused to move step by step. As armature 7 commences to turn through a step, motor 33 is energized to turn shaft 23 through the same step or angle as armature 7 turns. Preferably, contact segments 39 of member 38' are so arranged that the circuit through coil 44 is closed at some point during the turning of shaft 23 through said step or angle and opened again by the time the turning through said step has been completed, since if said circuit is closed at the exact time that turning through said step is completed, impulses will be sent continuously until the shaft 23 again commences to turn. At the time the circuit through coil 44 is closed, the contact portion of the proper one of members 20, 21, and 22 has been brought under its cooperating brush so that that one of coils 12, 13, and 14 which corresponds with the energized set of repeater coils is connected in the wireless sending circuit. Consequently an impulse of a frequency corresponding to the aforesaid set of repeater coils will have been sent by the time shaft 23 has been turned through an angle corresponding to that through which armature 7 has turned. In other words, for each step of said armature, an impulse corresponding in frequency with the set of repeater coils energized is sent, I have shown six contact segments on member 38', whereby the circuit of the wireless transmission system will be closed six times during one revolution of the repeater. It is evident, however, that, where the repeater has twelve steps per revolution, as is the case in the patent to Sperry aforementioned, twelve contacts might be arranged on member 38', whereby twelve wireless impulses per revolution of the repeater motor would be transmitted. Of course, if desired, six contacts, as shown may be used even where the repeater motor has twelve steps, with the result that six impulses per revolution would be sent, one for each two steps.

I have shown for purposes of illustration the wireless transmitting apparatus as controlled indirectly from the master indicating instrument 1 through the medium of one of the repeaters connected with said instrument. It will, however, be obvious that the shaft 23 can be driven directly by indicator 1 in the same manner as transmitter 2, and that transmitter 2, repeater 3, and the follow-up motor may be omitted from the connection between said indicator and said shaft.

In Fig. 2 I have shown one form of wireless receiving means adapted to cause the energization of the proper set of coils of a repeater motor 8 according to the frequency of the impulses received. Each set 48, 49, and 50 of the repeater coils is shown connected at one end to a common conductor 51 leading to one terminal of a source 52 of E. M. F. The sets of coils may be connected at their other ends with contacts 53, 54, and 55, respectively, of certain polarized relays which contacts are adapted to be engaged by the relay armatures 56, 57, and 58. Said armatures are shown connected with the other terminal of source 52 of E. M. F. Repeater motor 8 may be geared or otherwise connected, as is well known in the art, with a repeating indicator 8'.

A conventional open oscillatory circuit is shown at 59, coupled with which are a plurality of closed oscillatory circuits including coils 60, 61, and 62. In circuit with said coils are suitable detectors of electrical oscillations, such detectors being indicated at 63, 64, and 65. Coils 60, 61, and 62 cooperate with earthed coils 66, 67, and 68 of the aforesaid open oscillatory circuit and are each responsive to a different one of the frequencies sent by the transmitter magnet. Coils 69, 70, and 71 are interposed in the closed oscillatory circuits as shown and are adapted to attract armatures 56, 57 and 58, respectively, to close circuits through the sets of coils of the repeater motor 8.

Inasmuch as the armatures of the conventional repeater motors of the type shown are not polarized, it follows that the repeater may easily fall out of step with the transmitter if none of the coils of the repeater are energized, since the armature and indicator movable thereby are then free to take up positions in response to various external forces. Accordingly I have provided the polarized relays shown so that when one of said relays is energized it will close a circuit through the corresponding set of repeater coils and maintain such circuit closed until another set of coils is energized. The armatures 56, 57, and 58 may be polarized in any suitable and conventional manner. In series with coil 69 are coils 72 and 73 adapted, when energized, to withdraw armatures 57 and 58 from engagement with their respective contacts. Likewise, in series with coil 70 are coils 74 and 75 adapted to withdraw armatures 56 and 58, while in series with coil 71 are coils 76 and 77 adapted to withdraw armatures 56 and 57.

The operation of the above described receiving apparatus will now become evident. Assuming that an impulse is sent of a frequency corresponding to repeater coils 4 and to which coil 60 and detector 63 are responsive, coils 69, 72, and 73 are energized. Armature 56 is thus attracted to cause energization of set 48 of the repeater coils and simultaneously armatures 57 and 58 are kept out of engagement with their respective contacts. While the impulse may be of only brief duration, armature 56, being polarized, will remain in engagement with contact 53 and keep set 48 of the repeater coils energized. Said set of coils will remain energized until an impulse of a different frequency is sent. Thus, if an impulse of a frequency to which coil 61 is responsive is sent, such frequency corresponding with repeater coils 5, armature 56 will be withdrawn from engagement with contact 53 and simultaneously coil 70 will be energized to attract armature 57 and cause energization of set 49 of the repeater coils. If, on the other hand, an impulse of a frequency to which coil 62 is responsive and corresponding with repeater coils 6 were sent, armature 56 would be withdrawn from engagement with contact 53 and simultaneously coil 71 would be energized to attract armature 58 to cause energization of set 50 of the repeater coils. In this manner the armature of repeater motor 8 will be maintained in synchronism with motor 3 and indicator 1.

In Fig. 4 I have shown an alternative arrangement whereby twelve steps per repeater rotation may be obtained at the receiving station. In this case, two six pole repeater motors 78 and 78' may be so connected with the shaft 80, which actuates a suitable indicator, that the coils of one are displaced thirty degrees with respect to the corresponding coils of the other. Thus, if the sets of coils of one motor are energized in between the energizations of the sets of coils of the other motor, the shaft 80 will be moved through steps of thirty degrees each. For causing the coils of the aforesaid motors to be energized in the proper sequence I have shown connections similar to those shown in Fig. 2, except that six closed oscillatory circuits, including coils 81 to 86, responsive to different frequencies, are provided. In this case it is obvious that twelve impulses per revolution of the repeater 3 should be sent, as by providing twelve contact segments on member 38′. Also, it will be evident, that six different frequencies should be provided in the transmitting apparatus in place of the three shown, the frequencies corresponding to successive steps of the repeater through 180°. Inasmuch as it will be obvious to those skilled in the art, after inspection of Fig. 1, how six different inductances in place of three may be connected in the transmission circuit to obtain the desired results, further illustration is thought unnecessary.

The sets of coils of repeater 78 I have designated as 87, 88, and 89, while those of repeater 78′ are designated as 87′, 88′, and 89′. As shown, sets 87, 88, and 89 are connected at one end to one terminal of battery 79 and the other ends of said sets of coils are connected with contacts 91, 93, and 95. Sets of coils 87′, 88′, and 89′ are likewise connected at one end with the aforesaid terminal of battery 79 and the other ends of said coils are connected with contacts 92, 94, and 90. Contacts 90 to 95, inclusive, are adapted to be engaged by armatures of polarized relays of the type shown in Fig. 2, said armatures being connected with the other terminal of battery 79.

The operation of the construction shown in Fig. 4 will now be readily apparent. Assuming that coils 4 of motor 3 are energized and that an impulse of a frequency corresponding thereto is sent, to which frequency coil 82 is responsive, the armature which cooperates with contact 91 will be attracted to close a circuit through coils 87 of the repeater 78. If now, coils 5 of repeater motor 3 are energized while coils 4 remain energized the armature of said motor will move through thirty degrees and an impulse of a frequency to which coil 83 is responsive will be sent. A circuit through coils 87′ of motor 78′ will thereupon be closed and simultaneously therewith the circuit through coils 87 of motor 78 will be broken. If, on the other hand, while coils 4 remained energized, coils 3 had been energized, an impulse to which coil 81 is responsive would have been sent, which would have resulted in the simultaneous closing of a circuit through coils 89′ of repeater motor 78′ and breaking of the circuit through coils 87 of repeater motor 78. The indicator actuated by motors 78 and 78′ may thus be moved step-by-step in either direction and kept in synchronism with indicator 1.

Inasmuch as ships and aircraft are commonly provided with antennae for wireless telephone purposes, it will be evident that the same antennae, as well as other parts of the wireless apparatus, may be utilized in connection with my wireless repeater system. Hence no additional antennae are necessary. The wireless telephone apparatus coils, of course, operate with impulses of the usual or normal frequency, and additional frequencies may easily be provided, as, for example, in the manner above disclosed, for the operation of the repeater system.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention, what I claim and desire to secure by Letters Patent is, 1. In combination, a repeater motor having a plurality of pairs of poles, means responsive to radiant impulses of a given frequency for energizing one pair of said poles, and means responsive to radiant impulses of another frequency for energizing another pair of said poles.

2. In combination, a repeater motor having a plurality of pairs of poles, means responsive to radiant impulses for energizing said poles, and means for maintaining one pair of poles energized until the next pair is energized.

3. In combination, a repeater motor having a plurality of pairs of poles, means responsive to radiant impulses for energizing one pair of said poles, and means for simultaneously deenergizing said pair of poles and energizing another pair of poles.

4. In combination with a repeater motor having a plurality of pairs of poles, wireless means for energizing said pairs of poles successively.

5. In combination, a repeater motor, a bearing indicator actuated thereby, and wireless controlled means for actuating said motor.

6. In combination, a motor, a bearing indicator actuated thereby for indicating the bearing of a remote object, and wireless controlled means for actuating said motor.

7. In combination, a repeater motor having a plurality of poles, and a plurality of means responsive to radiant impulses of different frequencies for energizing the respective poles.

8. In combination, a repeater motor having a plurality of poles, and a plurality of means responsive to radiant impulses of different frequencies for energizing the respective poles successively.

9. In combination, a repeater motor having a plurality of pairs of poles, a bearing indicator actuated thereby, means responsive to radiant impulses for selectively energizing any one of said pairs of poles, and means for simultaneously deenergizing said pair of poles and energizing another pair of poles.

In testimony whereof I affix my signature.

ELMER A. SPERRY.